May 22, 1951   A. P. DUFOUR   2,553,903
DEVICES FOR OBTAINING COMPOSITE
PHOTOGRAPHS AND MOTION PICTURES
Filed Nov. 1, 1945   2 Sheets-Sheet 1
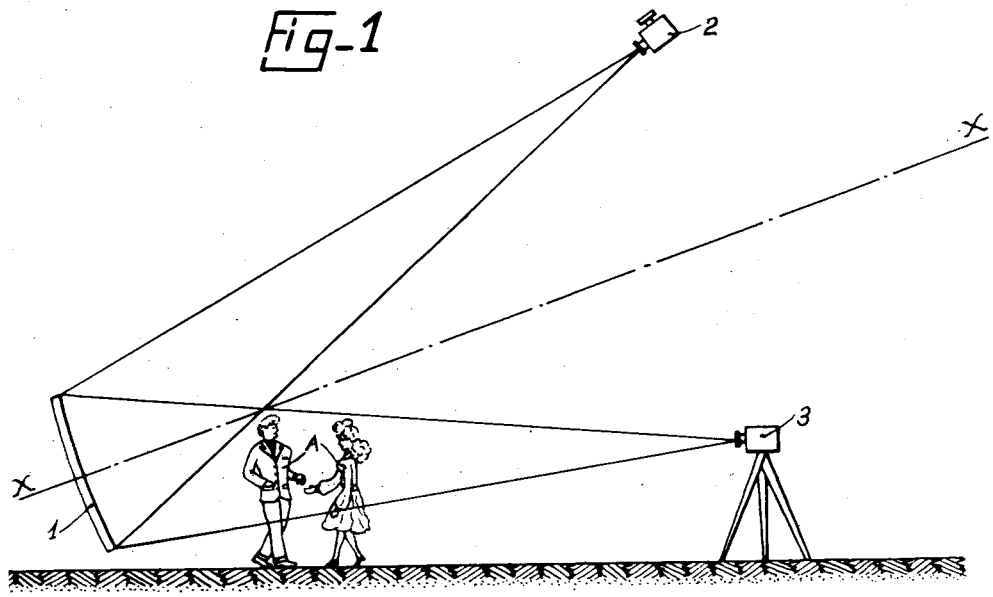
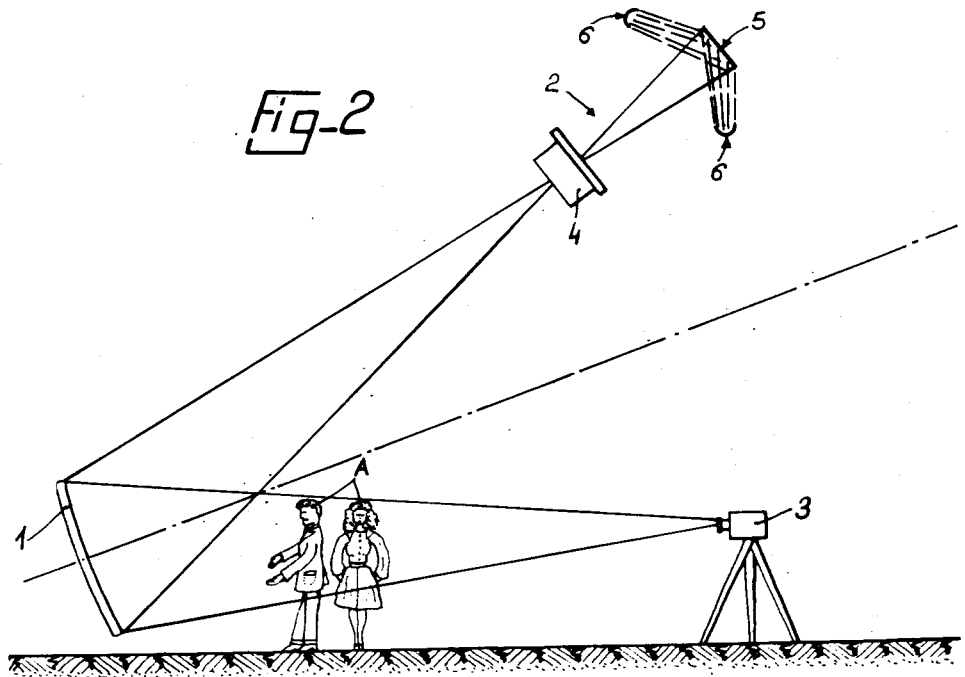
INVENTOR
ACHILLE PIERRE DUFOUR

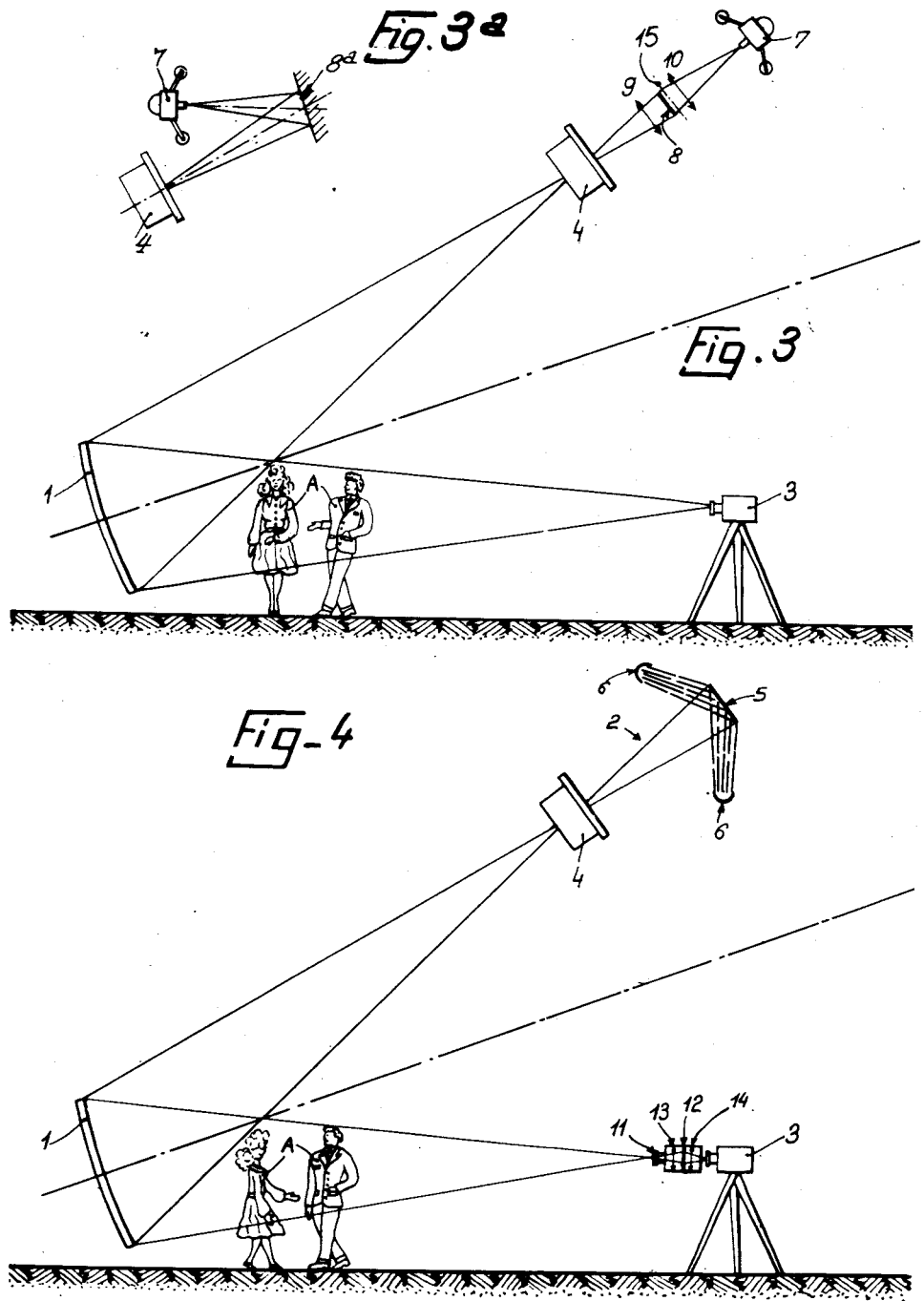

Patented May 22, 1951

2,553,903

UNITED STATES PATENT OFFICE 2,553,903

DEVICES FOR OBTAINING COMPOSITE PHOTOGRAPHS AND MOTION PICTURES

Achille Pierre Dufour, Paris, France

Application November 1, 1945, Serial No. 626,044
In France November 8, 1944

6 Claims. (Cl. 88—16)

The invention has for its object a device for taking fixed or moving pictures of a scene, a portion of which is constituted by an optical image obtained by projection.

A process of motion picture photography is already known, wherein the scenery is replaced by a fixed or moving projection on a conventional screen, in front of which stand the actors, while the whole is being photographed by a motion picture camera. It is also known to replace said screen by a ground glass screen, the projector being located behind that ground glass screen and the projected picture being photographed by transparency.

These methods offer various drawbacks. In the first place the image which stands for the scenery should require a very powerful source of light, in order that the large-sized image projected on the screen should be luminous enough to register on the film fed through the camera. Moreover, the actors who stand in front of the screen should be illuminated by means of auxiliary projectors, whereby a part of the light thus projected is diffused and falls upon the conventional screen or the ground glass screen and the quality of the images obtained by this method is most generally very poor.

The invention has for its object to remedy such drawbacks and consists in projecting a real or aerial image of a portion of the scene on or in the vicinity of a large-sized concave mirror in front of which stand the real objects constituting another portion of the scene (the actors for instance), the projector and the motion picture camera being so spaced from that mirror that the objective of one will be substantially located at the point of formation of the image of the other and the projector and camera axes making such angles with the optical axis of the mirror that the camera does not receive images from the mirror of objects other than the projector lens.

Due to this arrangement, the objective of the motion picture camera may be on the plane of formation of the image of the objective of the projector, thus receiving substantially the whole of the projected light; this permits of reducing to a reasonable value the intensity of the projection light, and the light used to illuminate the real objects may be projected in such a way as to be in no wise detrimental to the quality of the pictures.

Further features of the invention will be made clear from the following description, with reference to the accompanying drawings, which show, by way of example, various embodiments of the invention and wherein:

Fig. 1 is a diagrammatical elevational view of an installation upon which the invention is based, and wherein the scenery is obtained by a fixed projection.

Fig. 2 is a similar view of an installation, according to the invention, comprising a projector having a large opening and a large focal length.

Fig. 3 is a view similar to Fig. 2, showing an arrangement using a moving picture projector.

Fig. 3a shows a modification of a detail of Fig. 3 and

Fig. 4 shows the combination of such an installation with the provision of a small sized model and an auxiliary objective both disposed in front of the camera's objective.

In the diagram of Fig. 1, the installation comprises a large-sized concave mirror $1$ and a projector $2$, placed at a distance from mirror $1$ substantially equal to the radius of curvature of said mirror and intended to project on said mirror a real or aerial image of the view which stands for the scenery.

The actors A stand in front of the mirror and the camera 3 is so disposed that the light beam reflected by the mirror converges in the objective of the camera. In other words, said objective should be substantially located at the point of formation of the image of the objective of the projector 2.

In order to prevent the image of the actors A as formed by the mirror from falling within the field of the camera, the projector and the camera are located at a suitable distance from the optical axis X—X of the mirror.

In the diagram of Fig. 1, the projector is placed above the camera, but the reverse disposition may be adopted; they may also be placed in the same horizontal plane.

The distance between the projector and the mirror may be greater or less than the radius of curvature of the mirror, the camera 3 being then displaced accordingly, so that the objective thereof will still be located at the point of convergency of the light beam.

Such displacement may take place during the view taking, and may optionally be associated with a corresponding displacement of the actors A so as to produce "travelling" effects. The camera and the projector may also be displaced vertically and laterally, to produce similar effects.

It should be understood that the term "concave mirror" should be taken in a broad sense, as the mirror may consist for example of a large-sized lens, one face of which is silver-plated, and the radii of curvature of both faces being such as to cause said lens to act as a concave mirror.

In all cases, inasmuch as the average angle of incidence of the light beam, with reference to the optical axis of the mirror, has to be rather large (so as to eliminate from the field of the camera parasitical images of the actors given by the mirror) there is a considerable amount of astigmatism. Due to such astigmatism, it will be understood that, if the objective of the projector and the camera lens had similar diameters, the image of the objective of the projector as formed by the mirror would not consist of a circular spot of uniform brightness covering the objective of the camera, that the image formed by the objective of the camera would not be uniformly illuminated but would exhibit a bright central portion and dark marginal portions.

Attempts to correct such astigmatism by giving a suitable shape to the mirror or by the provision of complicated optical systems would be very costly, by reason of the large size of the mirror.

According to an important feature of the invention, instead of a conventional projector having an objective of substantially the same effective aperture as the objective of the motion picture camera, a special projector is used, the objective of which has a much larger effective aperture (Fig. 2). The purpose of this arrangement is as follows:

Due to the astigmatism resulting from the lateral offsetting of the projector the image of a projector's objective of normal opening (not greater than about that of the camera's objective) given by the concave mirror in the plane of the camera's objective would be an astigmatic image consisting of an elongated luminous spot surrounded by a dark marginal portion; so that the image of the scene projected by the projector and formed by the camera's objective on the film would comprise also a central bright portion surrounded by a dark portion and would be incomplete.

However, if, according to the invention, the small apertured projector's objective is replaced by one having a suitably large aperture, the field of the camera will be uniformly illuminated and the image of the scene on the film will be a large, uniformly illuminated circle encompassing the image area on the film; and, in that case, no additional correction of the astigmatism is necessary.

Merely by way of example, with a rectangular mirror of 2 m. x 2.50 m. having a radius of curvature of 8 m. and with a camera objective having 75 mm. focal length, the objective of the projector should have a focal length of 750 mm. and an opening of 250 mm., the distance between the camera and the projector being about 4 m.

In view of the very great focal length of the objective 4 of the projector (Fig. 2), instead of projecting pictures of the standard size of a film, the pictures 5 used at the projection should have a much larger size and will consist, for example, of diapositives, or drawings or photographic prints on paper, lighted by reflexion by means of luminous sources 6.

The high luminosity of the device, permitting the projection of images carried by an opaque support such as 5, affords an important advantage inasmuch as such pictures or photographic prints lighted by reflection generally give rephotographed images of much better quality than those derived from diapositives and films.

A further advantage of the high luminosity of the projection is that the method may be used outdoors, and that benefit may thus be derived from natural lighting, which is always superior to artificial lighting. In such case, the luminous sources 6 for illuminating the photograph or picture 5 are constituted by reflectors concentrating sunlight thereon.

It is often preferable not to accurately focus the projector so as to obtain a projected image having the greatest sharpness on the large concave mirror, but to effect adjustment in such manner as to cause the sharp image to be formed somewhat in front of the mirror, so as to control the degree of sharpness of the background with respect to the actors, i. e. the impression of relief.

Whenever the scenery should be movable, whereby the use of a motion picture projector is indispensable, the advantages of the disposition of Fig. 2 may be preserved by projecting the image of the scenery formed by the motion picture projector 7 on a ground glass screen 8 (Fig. 3) or better a small intermediate canvas screen 8a (Fig. 3a) and thereafter projecting said image on the large concave mirror 1 by means of a special large-sized objective 4.

Such disposition offers the substantial advantage of requiring a much less powerful light source, than the direct projection of the film on a canvas screen or a ground glass screen having the same size as the large concave mirror 1.

If the small screen used is of ground glass, it is advantageous to place in the vicinity thereof one or more positive lenses such as 9 and 10, ensuring a more uniform illumination of the field.

In order to obtain on the concave mirror 1 an upright image, the image of the intermediate screen 8 must be inverted, thus requiring either the reversal of the direction of feeding of the film in the projector, or the reversal of the position of the latter. Such reversal of the image may also be obtained by optical means, such as prisms, mirrors, lenses, etc.

The hereinabove described process applies as well to stationary photography as to motion picture photography; and it may also be combined with methods of motion picture photography wherein the foreground is constituted by a small-sized mask or model, as descrbed in applicant's copending patent application No. 571,971 filed February 28, 1945, now Patent 2,488,177, issued November 15, 1949.

Fig. 4 shows an arrangement of this kind, wherein a device comprising an auxiliary objective 11 is adapted to form a sharp real or aerial image of the scenery and the actors A in the plane of a diapositive or a mask, or a cut-out photograph 12, suitably illuminated, the composite image made up of the model and of the portions of the image from the scenery and the actors which are exposed through the transparent portions of the model being rephotographed by the camera 3. Condensers 13 and 14 are provided to increase the field of the camera.

In the device of Fig. 3, it is also possible to place a model, mask or cut-out drawing or photograph 15, suitably illuminated in front of the small ground glass screen 8. In such case, use will preferably be made of a ground glass which is colored in the mass, the ground side being turned towards the model to reduce diffusion by the ground surface and absorb the remainder of the light by the coloration of the glass (this method is practicable because of the small size of the screen and its high luminosity).

In all the devices described above, the concave mirror may be larger than required by the field of the camera 3, in order to provide panoramic effects by pivoting the camera about the optical center of its objective.

The impression of motion of the camera may also be afforded, either by moving the photograph or the model in the projector or else, if the scenery represents remote objects, by slowly displacing the actors standing on a movable platform.

Having now described my invention what I claim as new and desire to secure by Letters Patent is:

1. An installation for taking composite photographic pictures comprising in combination: a large-sized concave reflecting surface; means for projecting an aerial image in the vicinity of said surface and having an objective; a film-containing camera having an objective, for photographing said aerial image together with objects standing in front of said surface; the optical axes of said projecting means and of said camera forming a substantial angle having its vertex substantially at the center of said reflecting surface, and the optical axis of said reflecting surface bisecting said angle; said angle being such that the image of said objects formed by said surface is reflected outside the field of said camera; the distances from said reflecting surface to said projecting means and to said camera respectively being such that the image of the objective of the one as reflected by said surface is substantially in the plane of the objective of the other; the effective diameter of the objective of said projecting means being substantially greater than that of the camera's objective, the ratio between said effective diameters being such that the image of the objective of said projecting means formed after angular reflection from said surface onto said camera's objective encompasses the useful opening of said camera's objective and that the imaging area of the film is uniformly illuminated.

2. An installation as claimed in claim 1 wherein said projecting means comprises means for holding a picture of a large size and means for illuminating said picture by reflection.

3. An installation as claimed in claim 1, wherein said projecting means comprises a screen and a moving picture projector for projecting a film of conventional size on said screen.

4. An installation as claimed in claim 1, wherein said projecting means comprises an opaque screen, a moving picture projector for projecting a film of conventional size on one face of said screen, said objective of said projecting means and said moving picture projector being located opposite the same.

5. An installation as claimed in claim 1, wherein said projecting means comprises a translucent screen, light condensators arranged on at least one side of said screen and a moving picture projector for projecting a film of conventional size on said screen.

6. In an installation as claimed in claim 1, an auxiliary objective in the optical axis of the camera, adapted to form an aerial image of said objects and said first-mentioned aerial image in front of said camera and a model having opaque and transparent portions in the plane of formation of said second-mentioned aerial image.

ACHILLE PIERRE DUFOUR.

REFERENCES CITED

The following references are of record in the file of this patent:

UNITED STATES PATENTS

| Number | Name | Date |
|---|---|---|
| 972,373 | Hebig | Oct. 11, 1910 |
| 1,197,696 | Webb | Sept. 12, 1916 |
| 2,045,120 | Carpenter | June 23, 1936 |
| 2,076,103 | Thorner | Apr. 6, 1937 |
| 2,174,931 | Terry et al. | Oct. 3, 1939 |
| 2,281,033 | Garity | Apr. 28, 1942 |

FOREIGN PATENTS

| Number | Country | Date |
|---|---|---|
| 548,352 | France | Jan. 13, 1923 |
| 404,511 | Germany | Oct. 17, 1924 |
| 598,712 | Germany | June 18, 1934 |
| 805,939 | France | Sept. 7, 1936 |

OTHER REFERENCES

Edser, Edwin: "Light for Students," 1944 edition, printed by Macmillan & Co., London. Chapter VI cited, especially pages 124, 125, 129, 130 and 131.